US010902037B2

(12) United States Patent
Chandrakar et al.

(10) Patent No.: US 10,902,037 B2
(45) Date of Patent: Jan. 26, 2021

(54) COGNITIVE DATA CURATION ON AN INTERACTIVE INFRASTRUCTURE MANAGEMENT SYSTEM

(71) Applicant: INTERNATIONAL BUSINESS MACHINES CORPORATION, Armonk, NY (US)

(72) Inventors: Rahul Chandrakar, Bangalore (IN); Yogesh R. Kakde, Bengaluru (IN); Priya Kannan, Bangalore (IN); Naveen T. Kumar, Coimbatore (IN); Manjunatha Thejaswi Manjunatha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 750 days.

(21) Appl. No.: 15/687,622

(22) Filed: Aug. 28, 2017

(65) Prior Publication Data
US 2019/0065580 A1 Feb. 28, 2019

(51) Int. Cl.
*G06F 16/332* (2019.01)
*G06N 5/04* (2006.01)
(Continued)

(52) U.S. Cl.
CPC ........ *G06F 16/3329* (2019.01); *G06F 16/903* (2019.01); *G06N 5/04* (2013.01);
(Continued)

(58) Field of Classification Search
CPC .. G06F 16/3329; G06F 16/903; G06F 3/0481; G06F 3/167; G06N 20/00; G06N 5/04; H04L 51/04
See application file for complete search history.

(56) References Cited

U.S. PATENT DOCUMENTS 5,995,921 A * 11/1999 Richards ............... G06F 9/454
704/9
6,038,567 A 3/2000 Young
(Continued)

FOREIGN PATENT DOCUMENTS

WO 2009049404 A1 4/2009

OTHER PUBLICATIONS

IBM: List of IBM Patents or Patent Applications Treated as Related (Appendix P), Dec. 5, 2017, pp. 1-2.
(Continued)

*Primary Examiner* — Kamran Afshar
*Assistant Examiner* — Brent Johnston Hoover
(74) *Attorney, Agent, or Firm* — Steven M. Bouknight

(57) ABSTRACT

A method for providing an interactive infrastructure management system based on a chat interface is provided. The method may include receiving a first operation query via a first infrastructure management chat interface associated with an infrastructure management system. The method may include providing first data instructions using the first infrastructure management chat interface in response to the first operation query. The method may include generating a second infrastructure management chat interface associated with the infrastructure management system to edit and train the infrastructure management system based on the provided first data instructions. The method may include editing the provided first data instructions associated with the first operation query to train the infrastructure management system to respond to the first operation query. The may further include propagating the edited first data instructions to one or more second data instructions associated with a second operation query related to the first operation query.

17 Claims, 8 Drawing Sheets

(51) Int. Cl.
  *H04L 12/58* (2006.01)
  *G06N 20/00* (2019.01)
  *G06F 16/903* (2019.01)
  *G06F 3/16* (2006.01)
  *G06F 3/0481* (2013.01)

(52) U.S. Cl.
  CPC ............ *G06N 20/00* (2019.01); *H04L 51/04* (2013.01); *G06F 3/0481* (2013.01); *G06F 3/167* (2013.01)

(56) References Cited

U.S. PATENT DOCUMENTS

| | | | |
|---|---|---|---|
| 6,467,080 B1 * | 10/2002 | Devine | G06F 9/453 717/123 |
| 6,572,376 B1 | 6/2003 | Saunders | |
| 2006/0253289 A1 | 11/2006 | Kymal | |
| 2007/0028162 A1 | 2/2007 | Griffin | |
| 2008/0243842 A1 | 10/2008 | Liang | |
| 2014/0212053 A1 * | 7/2014 | Horiuchi | G06F 16/93 382/218 |
| 2014/0245141 A1 | 8/2014 | Yeh et al. | |
| 2015/0006492 A1 | 1/2015 | Wexler et al. | |
| 2015/0066479 A1 | 3/2015 | Pasupalak et al. | |
| 2015/0294216 A1 * | 10/2015 | Baughman | G06N 20/00 706/11 |
| 2017/0041304 A1 | 2/2017 | Tal et al. | |
| 2017/0212952 A1 | 7/2017 | Tee et al. | |
| 2018/0191652 A1 | 7/2018 | Goel | |
| 2018/0218160 A1 | 8/2018 | Wetherall et al. | |

OTHER PUBLICATIONS

Chandrakar et al., U.S. Appl. No. 15/831,413, filed Dec. 5, 2017, titled "Cognitive Data Curation on an Interactive Infrastructure Management System,", pp. 1-35.

Mell et al., "The NIST Definition of Cloud Computing," Recommendations of the National Institute of Standards and Technology, U.S. Department of Commerce, Special Publication 800-145, Sep. 2011, pp. 1-7.

* cited by examiner

COGNITIVE DATA CURATION ON AN INTERACTIVE INFRASTRUCTURE MANAGEMENT SYSTEM

BACKGROUND

The present invention relates generally to the field of computing, and more specifically, to data infrastructure management.

Generally, data infrastructure management is the process of managing information technology (IT) hardware and software, such as workstations, desktops, laptops, notebooks, etc. More specifically, data infrastructure management may include managing operation components, such as policies, processes, equipment, data, human resources, and external contacts that are associated with the IT hardware and software. Furthermore, data infrastructure management may divided into different categories, which may include systems management, network management, and storage management. One of the key aspects of data infrastructure management is the process of optimizing computer performance and data availability in order to quickly remediate computer issues and/or provide computer-related services. For example, one of the ways in which data infrastructure management techniques may help resolve computer issues or provide computer related-services may be to present a chat interface to communicate with users.

SUMMARY

A method for providing an interactive infrastructure management system based on a chat interface for cognitively curating, training, and presenting infrastructure management commands and data is provided. The method may include receiving at least one first operation query via a first infrastructure management chat interface associated with an infrastructure management system. The method may include providing first data instructions using the first infrastructure management chat interface in response to the received at least one first operation query. The method may include based on received user input associated with a user, generating a second infrastructure management chat interface associated with the infrastructure management system to edit and train the infrastructure management system based on the provided first data instructions. The method may include editing the provided first data instructions associated with the received at least one first operation query to train the infrastructure management system to respond to the received at least one first operation query based on received user actions. The method may further include propagating the edited first data instructions to one or more second data instructions associated with at least one second operation query that is related to the at least one first operation query.

A computer system for providing an interactive infrastructure management system based on a chat interface for cognitively curating, training, and presenting infrastructure management commands and data is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving at least one first operation query via a first infrastructure management chat interface associated with an infrastructure management system. The method may include providing first data instructions using the first infrastructure management chat interface in response to the received at least one first operation query. The method may include based on received user input associated with a user, generating a second infrastructure management chat interface associated with the infrastructure management system to edit and train the infrastructure management system based on the provided first data instructions. The method may include editing the provided first data instructions associated with the received at least one first operation query to train the infrastructure management system to respond to the received at least one first operation query based on received user actions. The method may further include propagating the edited first data instructions to one or more second data instructions associated with at least one second operation query that is related to the at least one first operation query.

A computer program product for providing an interactive infrastructure management system based on a chat interface for cognitively curating, training, and presenting infrastructure management commands and data is provided. The computer program product may include one or more computer-readable storage devices and program instructions stored on at least one of the one or more tangible storage devices, the program instructions executable by a processor. The computer program product may include program instructions to The method may include receiving at least one first operation query via a first infrastructure management chat interface associated with an infrastructure management system. The method may include providing first data instructions using the first infrastructure management chat interface in response to the received at least one first operation query. The method may include based on received user input associated with a user, generating a second infrastructure management chat interface associated with the infrastructure management system to edit and train the infrastructure management system based on the provided first data instructions. The method may include editing the provided first data instructions associated with the received at least one first operation query to train the infrastructure management system to respond to the received at least one first operation query based on received user actions. The may further include propagating the edited first data instructions to one or more second data instructions associated with at least one second operation query that is related to the at least one first operation query.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
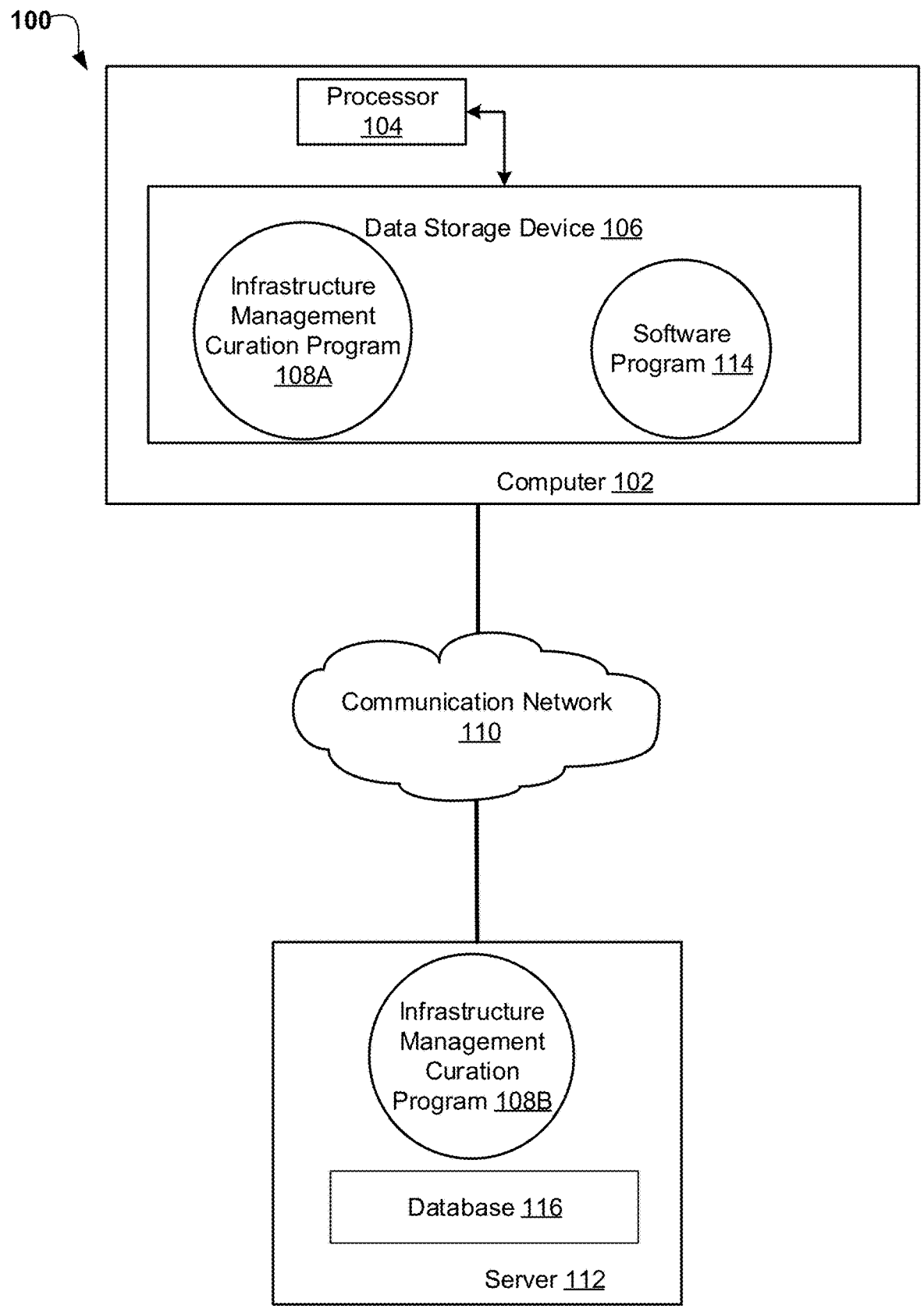
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computing, and more particularly, to data infrastructure management. The following described exemplary embodiments provide a system, method and program product for providing an interactive infrastructure management system based on a chat interface for cognitively curating, training, and presenting infrastructure management commands and data. Therefore, the present embodiment has the capacity to improve the technical field associated with data infrastructure management by enabling users to seamlessly integrate changes in an infrastructure management system through a chat interface using natural language processing as opposed to programming language techniques. Specifically, the present embodiment may enable a system administrator that is associated with an infrastructure management system to seamlessly curate, edit, and provide first infrastructure management commands and data through a chat interface in response to an operation query, and using an integrated cognitive system, may propagate the seamlessly provided first infrastructure management commands and data to one or more related second infrastructure management commands and data associated with a backend of the infrastructure management system.

As previously described with respect to data infrastructure management, one of the key aspects of data infrastructure management is the process of optimizing computer performance and data availability in order to quickly remediate computer issues and/or provide computer-related services. One of the ways in which data infrastructure management techniques may help resolve computer issues or provide computer related-services may be to present a chat interface to communicate with users. For example, a user may want to use a computer-related service to run programs over a specific type of virtual database, and in turn, may be provided a chat interface to communicate with an administrator whereby instructions may be presented to help implement the virtual database in response to receiving user input. However, the one or more processes to implement the virtual database may change. Specifically, the process for implementing the virtual database may change, for example, because the computer-related hardware and/or software components associated with the virtual database may be changed or updated, terminology referring to components associated with the virtual database may be changed, and/or commands for implementing the virtual database may be changed. In such cases, the instructions that may be presented through the chat interface to the user may be outdated, may use different terminology, may include different media content associated with the instructions, may include additional steps not presented, and/or may simply need to be changed due to error. As such, it may be advantageous, among other things, to provide a system, method and program product for providing an interactive infrastructure management system based on a chat interface for cognitively curating, training, and presenting infrastructure management commands and data. Specifically, the system, method and program product may enable a system administrator that is associated with an infrastructure management system to seamlessly curate, edit, and provide first infrastructure management commands and data through a chat interface in response to an operation query, and using an integrated cognitive system, may propagate the seamlessly provided first infrastructure management commands and data to one or more related second infrastructure management commands and data associated with a backend of the infrastructure management system.

According to at least one implementation of the present embodiment, at least one first operation query may be received via a first infrastructure management chat interface associated with an infrastructure management system. Then, using a cognitive system associated with the infrastructure management system, first data instructions may be provided through the first infrastructure management chat interface in response to the received at least one first operation query. Next, based on user input associated with a user, a second infrastructure management chat interface associated with the infrastructure management system may be generated to train the infrastructure management system in response to the provided first data instructions. Then, based on a received user action, the user may be enabled to edit the provided first data instructions associated with the received at least one first operation query. Next, using the cognitive system, the edited first data instructions may be propagated to one or more second data instructions associated with at least one second operation that is determined to be related to the at least one first operation query.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product providing an interactive infrastructure management system based on a chat interface for cognitively curating, training, and presenting infrastructure management commands and data.

According to at least one implementation, at least one first operation query may be received via a first infrastructure management chat interface associated with an infrastructure management system. Then, using a cognitive system associated with the infrastructure management system, first data instructions may be provided through the first infrastructure management chat interface in response to the received at least one first operation query. Next, based on user input associated with a user, a second infrastructure management chat interface associated with the infrastructure management system may be generated. Then, based on a received user action, the user may be enabled to edit the provided first data instructions associated with the received at least one first operation query to train the infrastructure management system to respond to the received at least one first operation query. Next, using the cognitive system, the edited first data instructions may be propagated to one or more second data instructions associated with at least one second operation that is determined to be related to the at least one first operation query.

Referring now to FIG. 1, an exemplary networked computer environment 100 in accordance with one embodiment is depicted. The networked computer environment 100 may include a computer 102 with a processor 104 and a data storage device 106 that is enabled to run an infrastructure management curation program 108A and a software program 114. The software program 114 may be an application program such as an internet browser and an email program. The infrastructure management curation program 108A may communicate with the software program 114. The networked computer environment 100 may also include a server 112 that is enabled to run an infrastructure management curation program 108B and a communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 6, server computer 112 may include internal components 810a and external components 910a, respectively, and client computer 102 may include internal components 810b and external components 910b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the infrastructure management curation program 108A, 108B may interact with a database 116 that may be embedded in various storage devices, such as, but not limited to a mobile device 102, a networked server 112, or a cloud storage service.

According to the present embodiment, a program, such as an infrastructure management curation program 108A and 108B may run on the client computer 102 or on the server computer 112 via a communications network 110. The infrastructure management curation program 108A, 108B may provide an interactive infrastructure management system based on a chat interface for cognitively curating, training, and presenting infrastructure management commands and data. Specifically, a user using a computer, such as computer 102, may run an infrastructure management curation program 108A, 108B, that interacts with a software program 114, to seamlessly curate, edit, and provide first data instructions through a chat interface in response to a received operation query, and using an integrated cognitive system, may propagate the seamlessly provided first data instructions to second data instructions associated with at least one second operation that is determined to be related to the received operation query.

Figure 2:
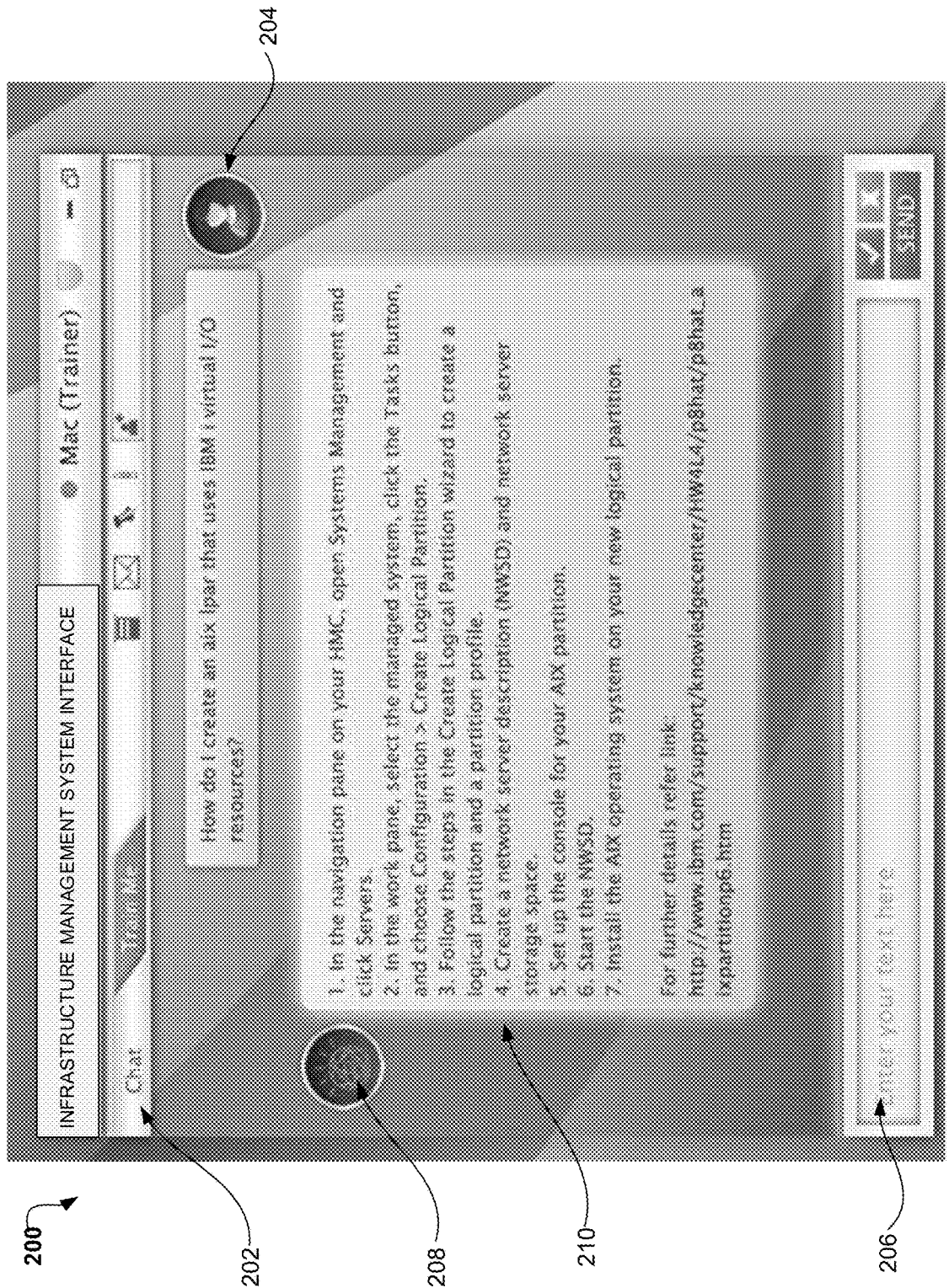
FIG. 2 is an example of a first infrastructure management chat interface associated with an infrastructure management curation program according to one embodiment.

Referring now to FIG. 2, an example of a first infrastructure management chat interface 200 associated with an infrastructure management curation program 108A, 108B (FIG. 1) based on an infrastructure management system according to one embodiment is depicted. Specifically, the infrastructure management curation program 108A, 108B (FIG. 1) may include the first infrastructure management chat interface 200 with a query chat window 202, as well as natural language processing systems and speech-to-text systems to receive operation queries and interact with users. The infrastructure management curation program 108A, 108B (FIG. 1) may further include an integrated cognitive system, such as IBM Watson® 208 (IBM Watson and all IBM Watson-based trademarks and logos are trademarks or registered trademarks of International Business Machines Corporation and/or its affiliates), process the received operation queries and provide results in response. Also, according to one embodiment, the query chat window 202 may be accessed by a user, for example, through one or more login methods, such as providing a username and password. Furthermore, the query chat window 202 may be used to receive one or more operation queries 204 from the user in order to provide data instructions 210 to perform one or more data commands associated with the infrastructure management system. For example, and according to one embodiment, using a query input box 206, and/or based on receiving a user's speech, a user may enter an operation query 204 such as, "[h]ow do I create an aix lpar that uses IBM i virtual I/O resources?" Thereafter, based on the received operation query 204, the infrastructure management curation program 108A, 108B (FIG. 1) may use the natural language processing systems to identify the received operation query, and may process the received operation query 204 using an integrated cognitive system 208 such as IBM Watson®. Thereafter, based on the processed operation query 204 and using IBM Watson®, the infrastructure management curation program 108A, 108B (FIG. 1) may provide a response that may include first data instruction 210 associated with the received operation query 204.

Figure 3:
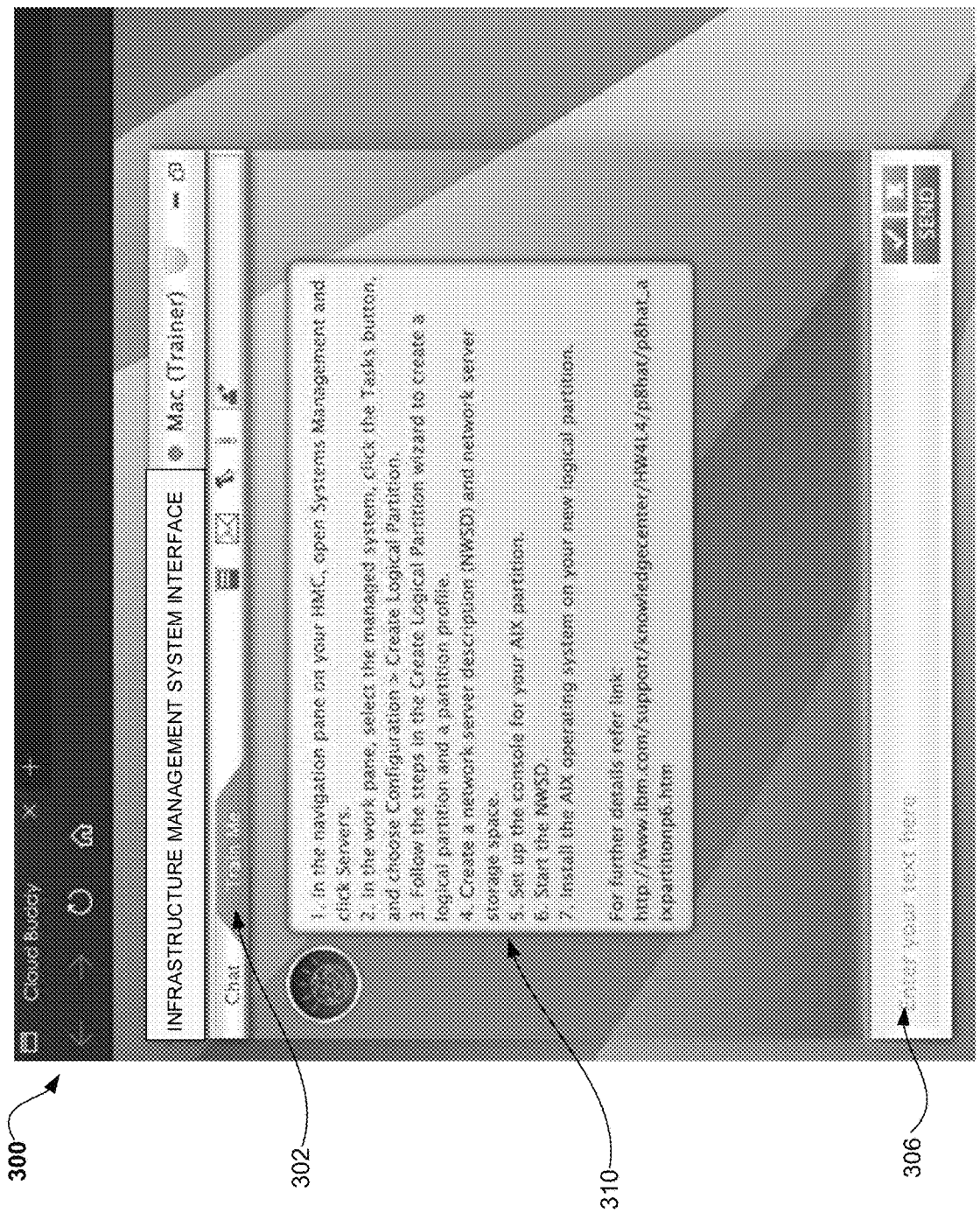
FIG. 3 is an example of a second infrastructure management chat interface associated with an infrastructure management curation program according to one embodiment.

Referring now to FIG. 3, an example of a second infrastructure management chat interface 300 associated with an infrastructure management curation program 108A, 108B (FIG. 1) based on an infrastructure management system according to one embodiment is depicted. Specifically, along with the first infrastructure management chat interface 200, the infrastructure management curation program 108A, 108B (FIG. 1) may also include the second infrastructure management chat interface 300 with a trainer chat window 302, as well as natural language processing systems and speech-to-text systems to receive information to train responses to the received operation queries 204. Also, according to one embodiment, the trainer chat window 302 may include restricted access that is reserved only for certain personnel, such as a system administrator, and may not be accessed by a user that may only have access to the first infrastructure management chat interface 200, whereas the system administrator may have access to both the first infrastructure management chat interface 200 and the second infrastructure management chat interface 300. Furthermore, the trainer chat window 302 may be used to receive one or more changes to the provided responses associated with the received operation query 202, and thereby train responses to the received operation query 202 as well as to one or more operation queries that are determined to be similar to the received operation query 202. Specifically, and based on the previously discussed example, the infrastructure management curation program 108A, 108B (FIG. 1) may provide first data instructions 210, 310 associated with the received operation query 204. However, the system administrator may deem the first data instructions 210, 310 to be unsatisfactory, insufficient, or in some way deficient, and therefore, may use a trainer chat box 306 associated with the trainer chat window 302 to edit the response associated with the received operation query 204 (FIG. 2). Thereafter, using the cognitive system such as IBM Watson®, the infrastructure management curation program 108A, 108B (FIG. 1) may propagate the change to the response associated with the received operation query 202 to one or more responses to similar operation requests.

Figure 4:
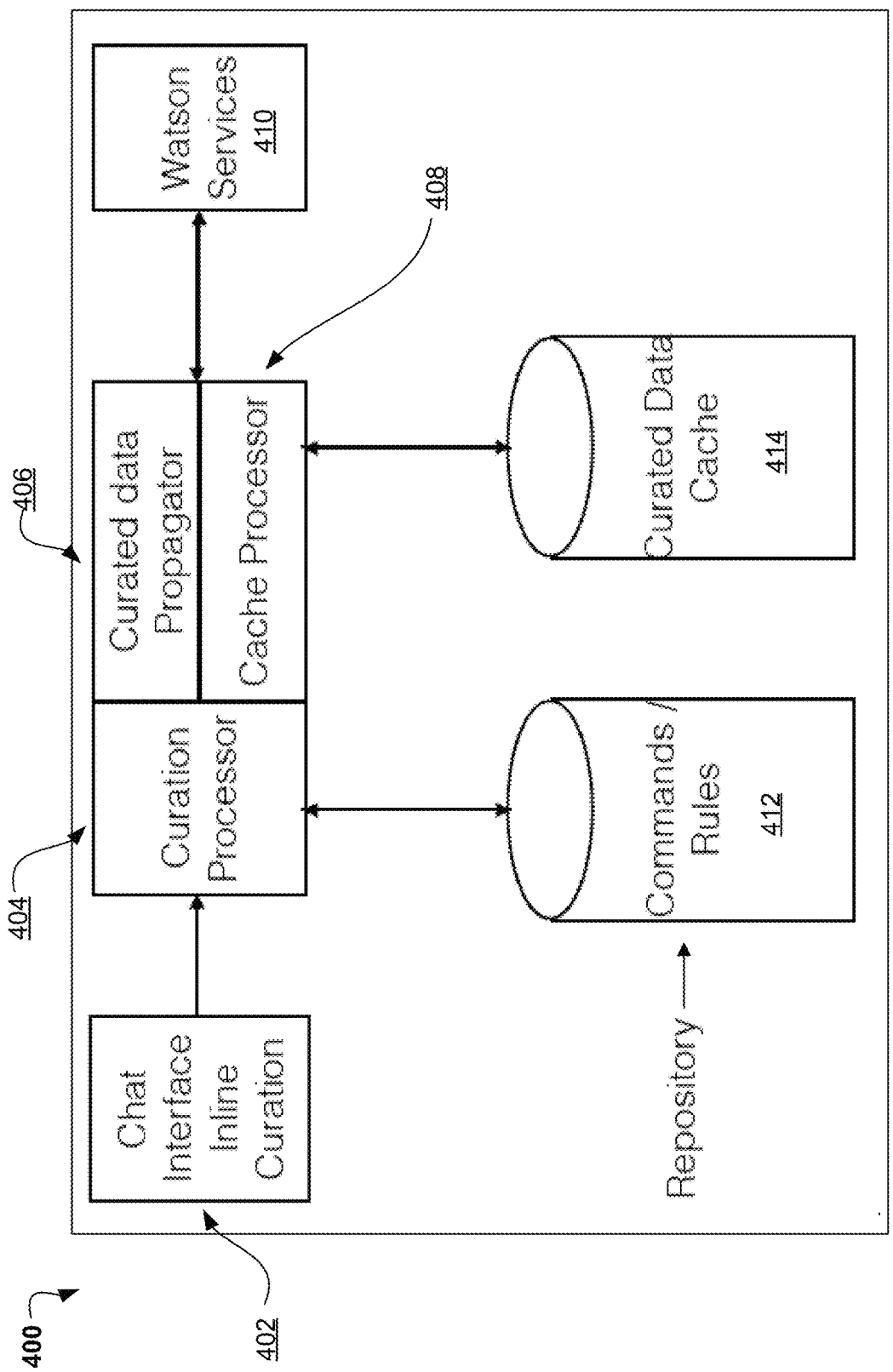
FIG. 4 is block diagram illustrating components of an infrastructure management curation program for providing an interactive infrastructure management system based on a chat interface according to one embodiment.

Referring now to FIG. 4, a block diagram 400 illustrating components of an infrastructure management curation program 108A, 108B (FIG. 1) according to one embodiment is depicted. Specifically, the infrastructure management curation program 108A, 108B (FIG. 1) may include chat interface inline curation 402 to provide the first infrastructure management chat interface 200 and the second infrastructure management chat interface 300 that enables the infrastructure management curation program 108A, 108B (FIG. 1) to receive operation queries 204 and receive information to train responses to the received operation queries 204 (FIG. 2) via the first infrastructure management chat interface 200 and the second infrastructure management chat interface 300, respectively. Furthermore, the infrastructure management curation program 108A, 108B (FIG. 1) may include a curation processor 404 to process the received operation queries 204 and the received information to train the responses to the received operation queries 204. Specifically, the infrastructure management curation program 108A, 108B (FIG. 1) may communicate with command/rules repository 412 to retrieve information associated with the received operation query 204 (FIG. 2), such as retrieving first data instructions 210, 310. Additionally, the infrastructure management curation program 108A, 108B (FIG. 1) may include curator data propagator 406 that may use the cognitive system, IBM Watson Services 410, to propagate changes to responses associated with the received operation queries 202 to one or more responses that are associated with similar operation requests in order to train the infrastructure management system on how to handle received operation requests of that type. More specifically, according to one embodiment, due to the training not taking immediate effect due to the amount of processed data to check and propagate the changes, the infrastructure management curation program 108A, 108B (FIG. 1) may use a cache processor 408 and curated data cache 414 locally that may be invalidated once the training data is processed by the cognitive system.

Figure 5:
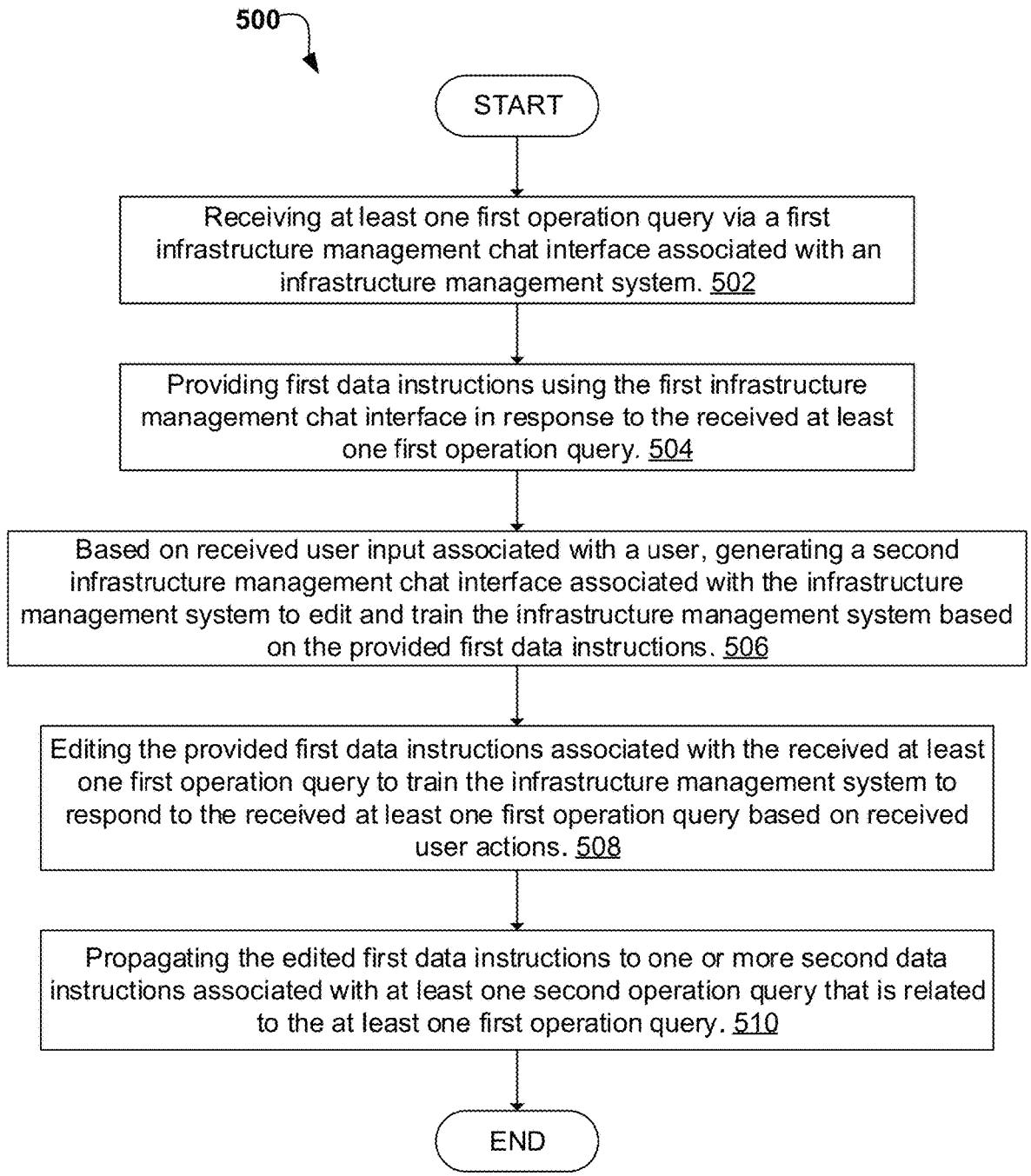
FIG. 5 is an operational flowchart illustrating the steps carried out by a program for providing an interactive infrastructure management system based on a chat interface for cognitively curating, training, and presenting infrastructure management commands and data according to one embodiment.

Referring now to FIG. 5, an operational flowchart 500 illustrating the steps carried out by a program for providing an interactive infrastructure management system based on a chat interface for cognitively curating, training, and presenting infrastructure management commands and data according to one embodiment is depicted. At 502, the infrastructure management curation program 108A, 108B (FIG. 1) may receive at least one first operation query 204 via a first infrastructure management chat interface 200 associated with an infrastructure management system. Specifically, and previously described in FIG. 2, the infrastructure management curation program 108A, 108B (FIG. 1) may include a first infrastructure management chat interface 200 with a query chat window 202. Furthermore, the infrastructure management curation program 108A, 108B (FIG. 1) may use the query chat window 202 to receive one or more operation queries 204 from a user. Specifically, for example, using a query input box 206, and/or based on receiving a user's speech, a user may enter an operation query 204 such as, "[h]ow do I create an aix Ipar that uses IBM i virtual I/O resources?"

Next, at 504, using a cognitive system associated with the infrastructure management system, the infrastructure management curation program 108A, 108B (FIG. 1) may provide first data instructions through the first infrastructure management chat interface in response to the received at least one first operation query. Specifically, according to one embodiment, the infrastructure management curation program 108A, 108B (FIG. 1) may receive the at least one operation query at curation processor 404, and using a cognitive system such as IBM Watson® 410, may in turn process the received at least one first operation query by retrieving instructions, commands, and rules from a commands/rules repository 412 based on information, including the terminology and phrases, associated with the received at least one first operation query 204. For example, and according to one embodiment, using a query input box 206, and/or based on receiving a user's speech, a user may enter an operation query 204 such as, "[h]ow do I create an aix Ipar that uses IBM i virtual I/O resources?" Thereafter, based on the received operation query 204, the infrastructure management curation program 108A, 108B (FIG. 1) may use natural language processing systems to identify terminology associated with the received operation query, and may process the received operation query 204 using an integrated cognitive system 208 such as IBM Watson® by retrieving instructions, commands, and rules from a commands/rules repository 412 based on the terminology and phrases such as, "create," "aix," "Ipar," and "IBM i virtual I/O resources."

Then, at 506, based on user input associated with a user, the infrastructure management curation program 108A, 108B (FIG. 1) may generate a second infrastructure management chat interface associated with the infrastructure management system to edit and train the infrastructure management system based on the provided first data instructions. Specifically, and as previously described in FIG. 3, the infrastructure management curation program 108A, 108B (FIG. 1) may include a second infrastructure management chat interface 300 with a trainer chat window 302. Also, according to one embodiment, the trainer chat window 302 may include restricted access that is reserved only for certain personnel, such as a system administrator, and may not be accessed by a user that may only have access to the first infrastructure management chat interface 200 (FIG. 2), whereas the system administrator may have access to both the first infrastructure management chat interface 200 (FIG. 2) and the second infrastructure management chat interface 300. For example, the infrastructure management curation program 108A, 108B (FIG. 1) may enable the system administrator to login and access the trainer chat window 302 associated with the second infrastructure management chat interface using a username and password.

Next, at 508, based on a received user action, the infrastructure management curation program 108A, 108B (FIG. 1) may enable the user to edit the provided first data instructions associated with the received at least one first operation query to train the infrastructure management system to respond to the received at least one first operation query. Specifically, and as previously described at step 506, the infrastructure management curation program 108A, 108B (FIG. 1) may enable a system administrator to login and access the trainer chat window 302 associated with the second infrastructure management chat interface using a username and password. Furthermore, the infrastructure management curation program 108A, 108B (FIG. 1) may use the trainer chat window 302 to receive one or more changes to the provided responses associated with the received operation query 204. More specifically, the infrastructure management curation program 108A, 108B (FIG. 1) may enable the system administrator/trainer to edit the infrastructure management commands and scripts that are responsible for generating a certain response to a user's infrastructure management query. The infrastructure management curation program 108A, 108B (FIG. 1) may further enable the system administrator/trainer to execute the edited scripts or commands to see, or preview, what the curated content looks like, this being within the query chat window 202 and/or the trainer chat window 302. For example, the infrastructure management curation program 108A, 108B (FIG. 1) may enable a system administrator to edit/change terminology, commands, context mapping, system interface details, scripts, natural language classifier (NLC), and system corpus associated with the responses (i.e. first data instructions 213, 310) to the received operation query 204.

Specifically, according to one embodiment, the infrastructure management curation program 108A, 108B (FIG. 1) may provide first data instructions 210, 310 associated with the received operation query 204. Thereafter, according to one embodiment, the infrastructure management curation program 108A, 108B (FIG. 1) may receive a user action such as a user clicking on the trainer chat box 306 associated with the trainer chat window 302 to edit the response associated with the received operation query 204 (FIG. 2) using natural language text. For example, the infrastructure management curation program 108A, 108B (FIG. 1) may receive a user typing commands such as "add an additional step after step 1," whereby the interactive infrastructure management system may register that the system administrator wants to change the response associated with the received query 204, and may respond by presenting the statement "ok, what step would you like to add" in the trainer chat window 302. Thereafter, the infrastructure management curation program 108A, 108B (FIG. 1) may enable the system administrator to update/change the provided first data instructions 210, 310 by entering additional text, links, commands, and content in the trainer chat box 306, and clicking send.

Next, at 510, using the cognitive system, the infrastructure management curation program 108A, 108B (FIG. 1) may propagate the edited first data instructions to one or more second data instructions associated with at least one second operation query related to the at least one first operation query. As previously described in steps 506 and 508, the infrastructure management curation program 108A, 108B (FIG. 1) may enable a system administrator to edit/change terminology, commands, context mapping, system interface details, scripts, natural language classifier (NLC), and a system corpus associated with the responses (i.e. first data instructions 213, 310) to the received operation query 204. Thereafter, using a cognitive system such as IBM Watson® 410, the infrastructure management curation program 108A, 108B (FIG. 1) may propagate the change to the response associated with the received operation query 202 to one or more responses to similar operation queries/requests. For example, the infrastructure management curation program 108A, 108B (FIG. 1) may use natural language processing techniques such as text analysis, linguistics analysis, syntax analysis, and data analysis on information associated with the infrastructure management system to compare the information on virtual databases and systems associated with the first operation query to different databases and systems of different operation queries, as well as compare the responses associated with the different operation queries to determine that certain responses associated with different operation queries are similar to the received first operation query 204. As such, using a cognitive system such as IBM Watson® 410, the infrastructure management curation program 108A, 108B (FIG. 1) may propagate the change of the first data instructions to one or more data instructions associated with the similar operation queries and responses, whereby propagating the update/change may include updating and changing the responses/data instructions to the similar operation queries in same and/or similar way to the related/similar operation queries.

It may be appreciated that FIGS. 2-5 provide only illustrations of one implementation and do not imply any limitations with regard to how different embodiments may be implemented. Many modifications to the depicted environments may be made based on design and implementation requirements.

Figure 6:
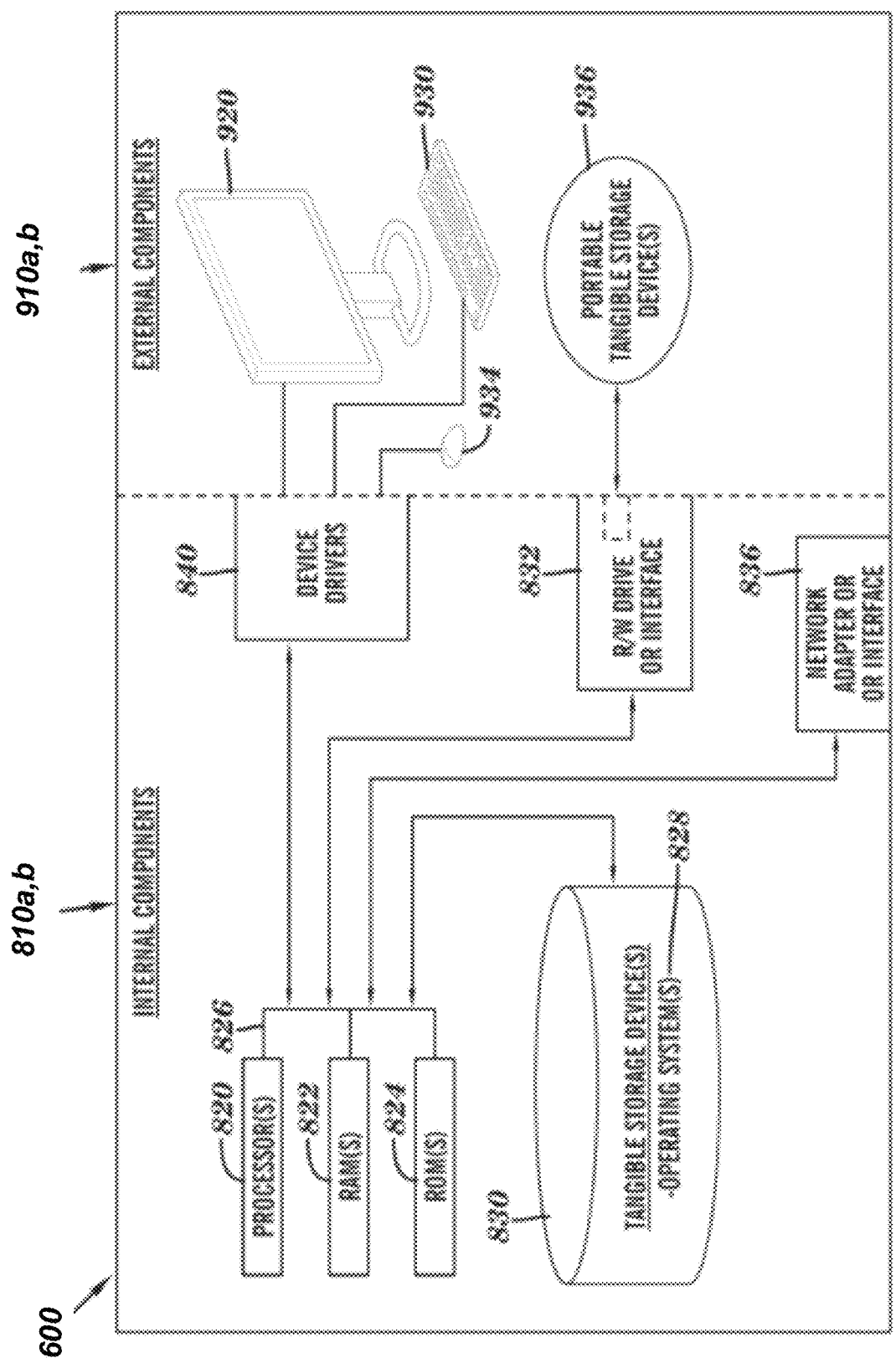
FIG. 6 is a block diagram of the system architecture of a program for providing an interactive infrastructure management system based on a chat interface for cognitively curating, training, and presenting infrastructure management commands and data according to one embodiment.

FIG. 6 is a block diagram 600 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 810, 910 is representative of any electronic device capable of executing machine-readable program instructions. Data processing system 810, 910 may be representative of a smart phone, a computer system, PDA, or other electronic devices. Examples of computing systems, environments, and/or configurations that may represented by data processing system 810, 910 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 810*a, b* and external components 910*a, b* illustrated in FIG. 6. Each of the sets of internal components 810*a, b* includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the infrastructure management curation program 108A (FIG. 1) in client computer 102 (FIG. 1), and the infrastructure management curation program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 6, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 810a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as an infrastructure management curation program 108A and 108B (FIG. 1), can be stored on one or more of the respective portable computer-readable tangible storage devices 936, read via the respective R/W drive or interface 832 and loaded into the respective hard drive 830.

Each set of internal components 810a, b also includes network adapters or interfaces 836 such as a TCP/IP adapter cards, wireless Wi-Fi interface cards, or 3G or 4G wireless interface cards or other wired or wireless communication links. The infrastructure management curation program 108A (FIG. 1) and software program 114 (FIG. 1) in client computer 102 (FIG. 1), and the infrastructure management curation program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the infrastructure management curation program 108A (FIG. 1) and software program 114 (FIG. 1) in client computer 102 (FIG. 1) and the infrastructure management curation program 108B (FIG. 1) in network server computer 112 (FIG. 1) are loaded into the respective hard drive 830. The network may comprise copper wires, optical fibers, wireless transmission, routers, firewalls, switches, gateway computers and/or edge servers.

Each of the sets of external components 910a, b can include a computer display monitor 920, a keyboard 930, and a computer mouse 934. External components 910a, b can also include touch screens, virtual keyboards, touch pads, pointing devices, and other human interface devices. Each of the sets of internal components 810a, b also includes device drivers 840 to interface to computer display monitor 920, keyboard 930, and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
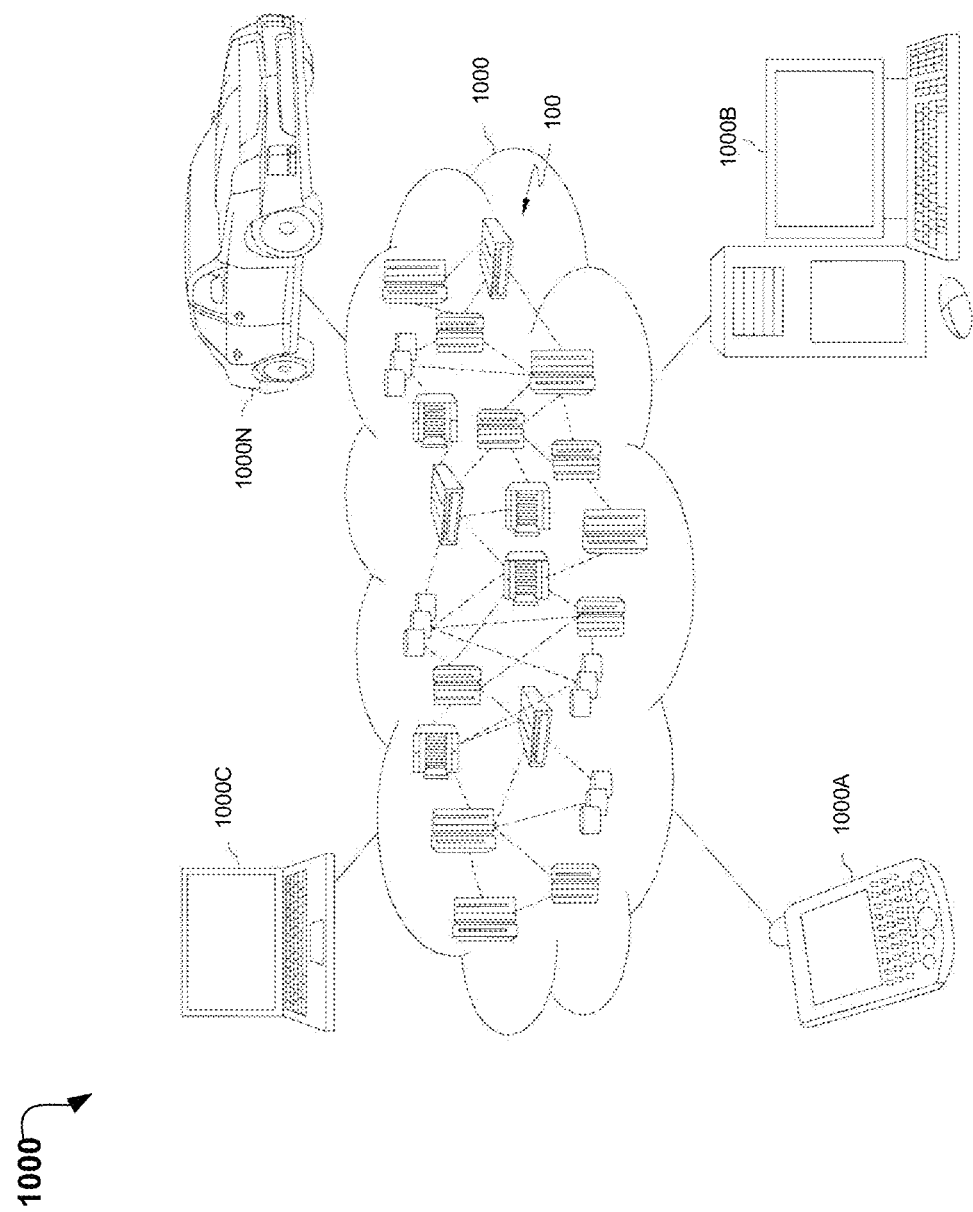
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
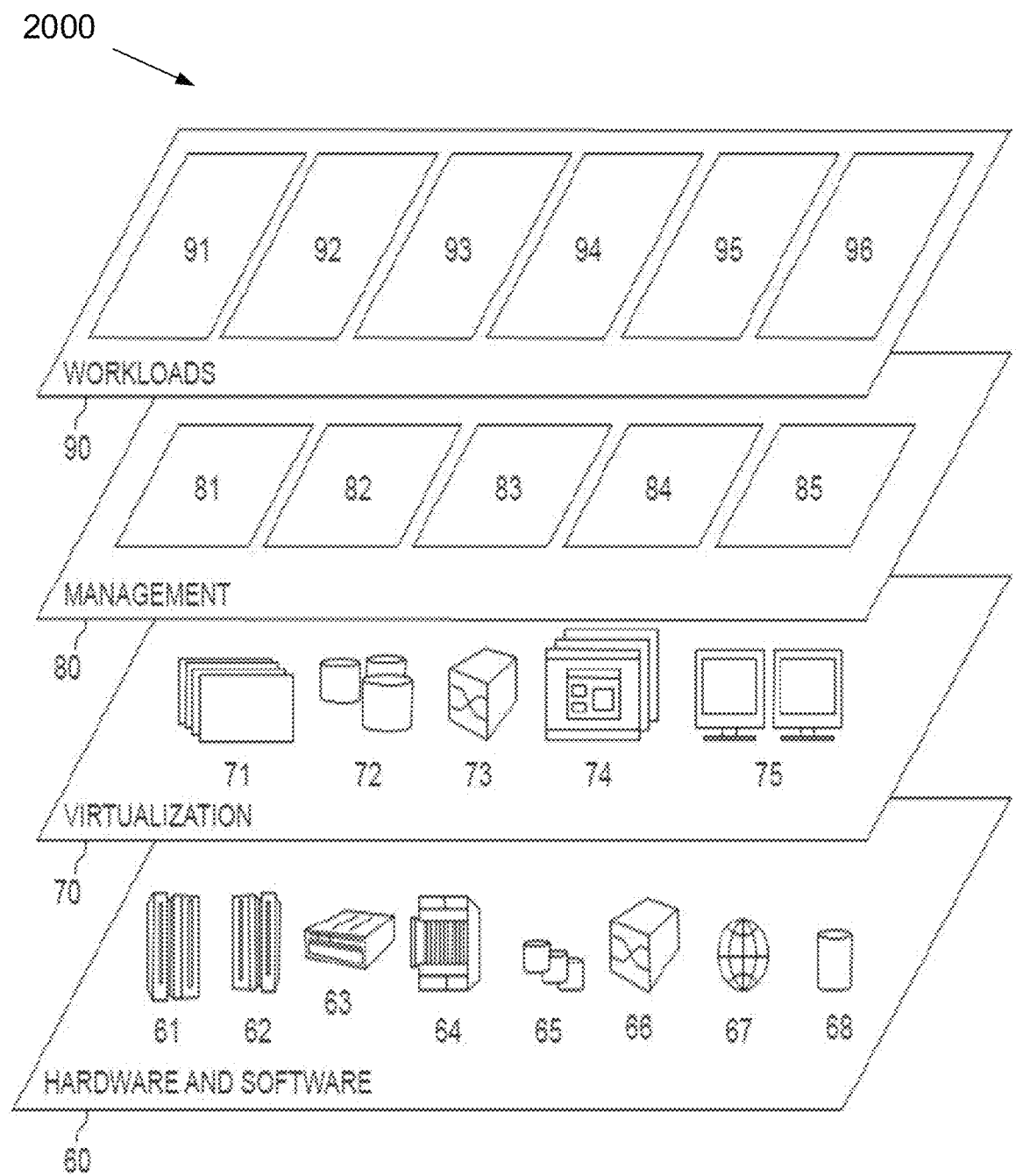
FIG. 8 is a block diagram of functional layers of the illustrative cloud computing environment of FIG. 7, in accordance with an embodiment of the present disclosure.

Referring now to FIG. 8, a set of functional abstraction layers 2000 provided by cloud computing environment 1000 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and infrastructure management curation 96. An infrastructure management curation program 108A, 108B (FIG. 1) may be offered "as a service in the cloud" (i.e., Software as a Service (SaaS)) for applications running on mobile devices 102 (FIG. 1) and may provide an interactive infrastructure management system based on a chat interface for cognitively curating, training, and presenting infrastructure management commands and data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing an interactive infrastructure management system based on a chat interface for curating, training, and presenting infrastructure management commands and data, the method comprising:

generating the interactive infrastructure management system, wherein the interactive infrastructure management system comprises a first infrastructure management chat interface to receive and respond to queries and a second infrastructure management chat interface to edit and train responses to the queries on the first infrastructure management chat interface, and wherein access to the second infrastructure management chat interface is restricted based on user login credentials;

receiving at least one first operation query via the first infrastructure management chat interface;

providing first data instructions using the first infrastructure management chat interface in response to the received at least one first operation query;

based on the user login credentials, providing access to the second infrastructure management chat interface associated with the infrastructure management system to edit and train the infrastructure management system based on the first data instructions provided on the first infrastructure management chat interface;

editing the provided first data instructions associated with the received at least one first operation query to train the infrastructure management system to respond to the received at least one first operation query based on received user actions; and based on the received editing of the first data instructions on the second infrastructure management chat interface, using a cognitive system to determine at least one second operation query that is similar to the at least one first operation query to propagate the edited first data instructions to one or more second data instructions associated with the at least one second operation query.

2. The method of claim 1, wherein receiving the at least one first operation query further comprises:

receiving the at least one first operation query via at least one of a query input box and a user speech.

3. The method of claim 1, wherein providing first data instructions further comprises:

using a cognitive system to process the received at least one first operation query by retrieving instructions from a command rules repository based on query information associated with the received at least one first operation query.

4. The method of claim 1, wherein editing the provided first data instructions associated with the received at least one first operation query further comprises:

receiving at least one of user text and user speech on a trainer chat box associated with the generated second infrastructure management chat interface to edit the first data instructions associated with the received at least one first operation query using natural language processing systems.

5. The method of claim 1, wherein the edited first data instructions comprises one or more changes to at least one of a terminology, a command, a context mapping, one or more system interface details, a script, and a natural language classifier, and further comprises:

enabling the user to execute the edited first data instructions to preview a response to the at least one first operation query and the at least one second operation query.

6. The method of claim 1, wherein propagating the edited first data instructions to the one or more second data instructions associated with the at least one second operation query further comprises:

using natural language processing techniques on the infrastructure management system to compare the first query information associated with the received at least one first operation query to second query information associated with the at least one second operation query to determine that the first data instructions associated with the received at least one first operation query are similar to the one or more second data instructions associated with the at least one second operation query; and editing the one or more second data instructions to the at least one second operation query based on the edited first data instructions.

7. A computer system for providing an interactive infrastructure management system based on a chat interface for curating, training, and presenting infrastructure management commands and data, comprising:

one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:

generating the interactive infrastructure management system, wherein the interactive infrastructure management system comprises a first infrastructure management chat interface to receive and respond to queries and a second infrastructure management chat interface to edit and train responses to the queries on the first infrastructure management chat interface, and wherein access to the second infrastructure management chat interface is restricted based on user login credentials;

receiving at least one first operation query via the first infrastructure management chat interface;

providing first data instructions using the first infrastructure management chat interface in response to the received at least one first operation query;

based on the user login credentials, providing access to the second infrastructure management chat interface associated with the infrastructure management system to edit and train the infrastructure management system based on the first data instructions provided on the first infrastructure management chat interface;

editing the provided first data instructions associated with the received at least one first operation query to train the infrastructure management system to respond to the received at least one first operation query based on received user actions; and based on the received editing of the first data instructions on the second infrastructure management chat interface, using a cognitive system to determine at least one second operation query that is similar to the at least one first operation query to propagate the edited first data instructions to one or more second data instructions associated with the at least one second operation query.

8. The computer system of claim 7, wherein receiving the at least one first operation query further comprises:

receiving the at least one first operation query via at least one of a query input box and a user speech.

9. The computer system of claim 7, wherein providing first data instructions further comprises:

using a cognitive system to process the received at least one first operation query by retrieving instructions from a command rules repository based on query information associated with the received at least one first operation query.

10. The computer system of claim 7, wherein editing the provided first data instructions associated with the received at least one first operation query further comprises:

receiving at least one of user text and user speech on a trainer chat box associated with the generated second infrastructure management chat interface to edit the first data instructions associated with the received at least one first operation query using natural language processing systems.

11. The computer system of claim 7, wherein the edited first data instructions comprises one or more changes to at least one of a terminology, a command, a context mapping, one or more system interface details, a script, and a natural language classifier, and further comprises:

enabling the user to execute the edited first data instructions to preview a response to the at least one first operation query and the at least one second operation query.

12. The computer system of claim 7, wherein propagating the edited first data instructions to the one or more second data instructions associated with the at least one second operation query further comprises:
    using natural language processing techniques on the infrastructure management system to compare the first query information associated with the received at least one first operation query to second query information associated with the at least one second operation query to determine that the first data instructions associated with the received at least one first operation query are similar to the one or more second data instructions associated with the at least one second operation query; and
    editing the one or more second data instructions to the at least one second operation query based on the edited first data instructions.

13. A computer program product for providing an interactive infrastructure management system based on a chat interface for curating, training, and presenting infrastructure management commands and data, comprising:
    one or more computer-readable storage devices and program instructions stored on at least one of the one or more tangible storage devices, the program instructions executable by a processor, the program instructions comprising:
    program instructions to generate the interactive infrastructure management system, wherein the interactive infrastructure management system comprises a first infrastructure management chat interface to receive and respond to queries and a second infrastructure management chat interface to edit and train responses to the queries on the first infrastructure management chat interface, and wherein access to the second infrastructure management chat interface is restricted based on user login credentials;
    program instructions to receive at least one first operation query via the first infrastructure management chat interface;
    program instructions to provide first data instructions using the first infrastructure management chat interface in response to the received at least one first operation query;
    based on the user login credentials, program instructions to provide access to the second infrastructure management chat interface associated with the infrastructure management system to edit and train the infrastructure management system based on the first data instructions provided on the first infrastructure management chat interface;
    program instructions to edit the provided first data instructions associated with the received at least one first operation query to train the infrastructure management system to respond to the received at least one first operation query based on received user actions; and
    based on the received editing of the first data instructions on the second infrastructure management chat interface, program instructions to use a cognitive system to determine at least one second operation query that is similar to the at least one first operation query to propagate the edited first data instructions to one or more second data instructions associated with at least one second operation query.

14. The computer program product of claim 13, wherein the program instructions to provide first data instructions further comprises:
    program instructions to use a cognitive system to process the received at least one first operation query by retrieving instructions from a command rules repository based on query information associated with the received at least one first operation query.

15. The computer program product of claim 13, wherein the program instructions to edit the provided first data instructions associated with the received at least one first operation query further comprises:
    program instructions to receive at least one of user text and user speech on a trainer chat box associated with the generated second infrastructure management chat interface to edit the first data instructions associated with the received at least one first operation query using natural language processing systems.

16. The computer program product of claim 13, wherein the edited first data instructions comprises one or more changes to at least one of a terminology, a command, a context mapping, one or more system interface details, a script, and a natural language classifier, and further comprises:
    enabling the user to execute the edited first data instructions to preview a response to the at least one first operation query and the at least one second operation query.

17. The computer program product of claim 13, wherein the program instructions to propagate the edited first data instructions to the one or more second data instructions associated with the at least one second operation query further comprises:
    program instructions to use natural language processing techniques on the infrastructure management system to compare the first query information associated with the received at least one first operation query to second query information associated with the at least one second operation query to determine that the first data instructions associated with the received at least one first operation query are similar to the one or more second data instructions associated with the at least one second operation query; and
    program instructions to edit the one or more second data instructions to the at least one second operation query based on the edited first data instructions.

\* \* \* \* \*